United States Patent [19]

Ong et al.

[11] 4,347,344

[45] Aug. 31, 1982

[54] ORIENTED P-METHYL STYRENE POLYMER

[75] Inventors: S. Christine Ong, Somerville; Margaret N. Bright, Jamesburg, both of N.J.

[73] Assignee: Mobil Oil Corporation, New York, N.Y.

[21] Appl. No.: 190,535

[22] Filed: Sep. 24, 1980

[51] Int. Cl.$^3$ ............................................. C08F 12/12
[52] U.S. Cl. .............................. 526/347.1; 264/210.7; 526/347; 526/348.1
[58] Field of Search .................. 526/347.1, 348.1, 347

[56] References Cited

U.S. PATENT DOCUMENTS

| | | | |
|---|---|---|---|
| 2,695,420 | 11/1954 | Longstreth et al. | 18/1 |
| 2,997,743 | 8/1961 | Isaksen et al. | 18/48 |
| 3,322,855 | 5/1967 | Fukushima et al. | 260/874 |
| 3,619,445 | 11/1971 | Carlson, Jr. | 264/95 |
| 4,011,357 | 3/1977 | Haase | 428/215 |
| 4,039,734 | 8/1977 | Hendy | 526/258 |
| 4,151,159 | 4/1979 | Geall et al. | 260/42.46 |
| 4,151,318 | 4/1979 | Marshall | 428/35 |
| 4,205,114 | 5/1980 | Canterino et al. | 428/315 |

*Primary Examiner*—Stanford M. Levin
*Attorney, Agent, or Firm*—Charles A. Huggett; James F. Powers, Jr.; James P. O'Sullivan, Sr.

[57] ABSTRACT

Biaxially-oriented film comprising a layer of solid thermoplastic methyl styrene polymer, said polymer having at least 90 percent repeating units of 4-methyl-styrene.

5 Claims, No Drawings

ORIENTED P-METHYL STYRENE POLYMER

BACKGROUND OF THE INVENTION

This invention relates to plastic films and sheet materials containing poly(paramethyl styrene), herein referred to as PPMS. In particular, it concerns oriented films of PPMS and methods for manufacturing films, foils, sheets, laminates or similar products.

It is well known in the plastics arts that styrene homopolymers and copolymers are useful in making low cost films and sheet products. Alkyl-substituted styrenes are well known as monomers for addition polymerization, especially α-methyl styrene and various mixed isomers of ring-substituted methyl styrene. These mixed isomers are usually a reaction product of ethylated toluene which has been dehydrogenated to obtain a mixture rich in para and ortho isomers. Biaxially oriented polystyrene is generally known and described in U.S. Pat. No. 2,997,743 (Isaksen et al.), U.S. Pat. No. 3,619,445 (Carlson), and U.S. Pat. No. 4,011,357 (Haase).

Various copolymers of acrylonitrile containing a minor amount of styrene or other comonomers, such as 4-methylstyrene, are disclosed in U.S. Pat. No. 4,039,734 (Hendy) as being suitable for making biaxially-oriented films. Also, the uncharacterized vinyl toluene monomers, usually a mixture of isomers, with large amounts of ortho and meta compounds, are known as copolymeric materials, of instance as hot drawn film disclosed in U.S. Pat. No. 3,322,855 (Fukushima et al.).

Molecular orientation of thermoplastic resins can be achieved by stretching a sheet, usually 2 to 8 times its original linear dimension. This stretching operation can be performed uniaxially or biaxially by several techniques, for example by sequentially stretching a continuous strip in the machine and transverse directions, as taught in U.S. Pat. No. 2,695,420 (Longstreth et al.).

SUMMARY OF THE INVENTION

It has been discovered that a polymer film containing a large portion of its repeating units, e.g. 90% or more, as p-methyl styrene can be oriented to obtain valuable products having superior elastic modulus and dimensional stability properties.

DESCRIPTION OF PREFERRED EMBODIMENTS

In conventional methods of producing a solid oriented film, a molten polymer is formed into a thin sheet and oriented by hot stretching above its glass transition temperature. The improvement herein comprises employing a thermoplastic high polymer consisting essentially of poly(para-methyl styrene), preferably containing less than 5% meta isomer and substantially free of ortho-methyl styrene (e.g., less than 0.1%).

While this invention is directed in particular toward the homopolymeric PPMS, minor amounts of one or more other ethylenically unsaturated compounds may be interpolymerized without deleterious effects on the properties of the film. In addition to the various isomers of the major monomer such as the vinyl toluenes (e.g. 65:35 meta:para mixture), α-methyl styrene, other mono-unsaturated hydrocarbons of low molecular weight may be incorporated by addition polymerization methods. Technical grade para-methyl styrene is typically 95–97 weight percent pure, with up to 5% of other isomers, especially meta. Polysubstituted benzenoids having alkyl, halogen or other moieties may be employed in minor amount, as may lower alkyl acrylic and methacrylic esters, $C_2$ to $C_8$ mono-olefins, acrylonitrile, dienes and substituted styrenes in non-deleterious amount. Usually, multi-functional comonomers which produce excessive cross-linking are minimized or removed completely to assure that thermoplastic and working properties are undiminished.

The polymers useful herein include a wide range of molecular weight materials, e.g. 50,000 to 500,000 or more with melt index of about 0.1 to 10. Conventional free radical-initiated polymerization process may be employed in synthesizing the resins.

EXAMPLE 1

An essentially homopolymeric resin is prepared from an isomeric mixture of 97% 4-methyl styrene with the balance being essentially 3-methyl styrene and free of the ortho isomer except in trace amounts. The polymerization is carried out under free radical polymerization conditions by suspension in water at a PMS/$H_2O$ ratio of 1:1. The dispersed organic phase includes 100 parts by weight of para-methyl styrene, 0.05 parts "Irganox 1076" antioxidant, 0.75 $(10)^{-4}$ parts "Perox Blue 2R" dye, 0.19 parts benzoyl peroxide and 0.38 parts of "Esperox 497M" (75%). To an agitated, nitrogen-purged reaction vessel the 100 parts water are added and heated to 85° C. while 1 part of tricalcium phosphate is dispersed. The dispersed phase is added to the aqueous phase slowly over a period of about 20 minutes, while stirring the reactor at 600 RPM and maintaining temperature at about 76° C. After continuing agitation for 5 minutes a catalytic amount of potassium persulfate is added in aqueous solution to initiate the polymerization, and further addition of catalyst is made after 5 hours, after which the reaction temperature is increased linearly from 92° C. to about 120° C. over 3 hours and held for 2 hours before cooling to 50°–60° C.

The resin is recovered in solid bead form and dried. It has a molecular weight of about 320,000 (visc. avg. in toluene at 30° C.). The melt index is 1.7±0.25 g/10 min. The polymer is essentially linear with no evidence of crosslinking.

The PPMS polymer is compression molded at about 150° C. under 20 atmospheres maximum pressure for 2.5 hours to form a flat sheet. These conditions avoid crosslinking and gel formation. The sheet is biaxially oriented by stretching 7:1 in perpendicular directions on a standard T.M. Long orientation stretcher. The stretching temperature for both machine direction (MD) and transverse direction (TD) orientation steps is about 120° C. (i.e. about 10° C. above Tg), and the stretching rates are 1000%/min. (MD) and 700%/min. (TD). The product is an oriented film 23μ thick having properties tabulated below with comparable data for polystyrene.

TABLE I

| Material | Elastic Modulus (psi × $10^5$) | | Dimensional Change ⅛ 100° C. | |
|---|---|---|---|---|
| | MD | TD | MD | TD |
| PPMS | 5.57 | 5.57 | −29% | −35% |
| Polystyrenes | | | | |
| Foster Grant 50D* | 5.05 | 5.11 | −34% | −37% |
| Dow Trycite 1000 (published data) | | 4.50** | — | — |

*Molded at 200° C. for 0.3 hours. Other conditions same as PPMS
**Commercially available material The elongation at break, tensile strength and orientation properties of the PPMS film are nearly the same as for the oriented polystyrene, with barrier properties (water vapor and oxygen) being nearly identical. The oriented PPMS film has excellent optical quality. Standard ASTM values for haze is 1.2% and 45° gloss is 84 to 101%.

Various fillers, dyes, optical brighteners, stabilizers, pigments, slip agents, pore-forming materials, plasticizers, anti-stats, and other additives may be incorporated in the polymeric material within the scope of this invention.

The oriented films which constitute this invention are useful as packaging materials and have heat seal properties which render them valuable for numerous thermal bonding applications, laminates, etc. For instance, a laminate of flat extruded polystyrene/PPMS foam may be directly heat sealed to the biaxially-oriented PPMS. Such stock materials are useful in molding containers and in thermal insulation applications.

It is generally known to orient thermoplastic polymers and the methods may be advantageous to particular forming techniques. For example, a film produced by extrusion through a slot orifice may be cooled to the stretching temperature and passed through two sets of pinch rolls, the last rotating faster than the first. The degree of orientation will depend upon the relative rotational speeds of the two sets of rolls and the temperature of the films. This process achieves stretching in only one direction and the strength of the film is increased solely in that direction.

Stretching in two directions may be sequential or simultaneous. One suitable method for sequential orientation is to extrude the film through a slot orifice, draw it longitudinally by a pinch-roll system, and then draw it laterally by means of pairs of clamps which are attached to the edges of the film and which are arranged to move apart as the film is led forward. The film may be heated during the stretching steps by passing it over a heated roll or by means of hot inert gases or liquids or by infra-red heating.

A convenient method for orienting a film in two directions simultaneously is to extrude the molten polymer through an annular orifice to give a tube and to draw the tube lengthwise by flattening it and passing it through two sets of nip rolls, the second rotating faster than the first. The tube is simultaneously stretched by internal gas pressure created within the tube between the two sets of nip rolls. The presence of the first set of nip rolls also prevents the point of expansion moving backwards to a position at which the tube after extrusion is still at a temperature at which flow would occur to the detriment of orientation. This method may be advantageous for PPMS co-extruded with other polymers, as disclosed in U.S. Pat. No. 4,151,318 (Marshall).

Another method is extrude the film from a slit orifice, cool it and grip each side of the cooled film by a number of pairs of clamps. The clamps are then drawn along a path such that those in each pair diverge laterally from each other and the distance between adjacent pairs is also increased, thus stretching the film laterally and longitudinally. The oriented films have improved tensile strength, and are less brittle.

Films made according to the present invention can be coated with thermoplastic heat-seal coatings or slip coatings or can be used in uncoated form, and they can be heat-sealed without coating making them generally useful as packaging materials. Heterofilms (in which two or more films are formed together) and laminates (in which two or more films are separately formed and subsequently laminated) may be formed with good adhesion between the layers without the need for a separate adhesive. For example, a layer of thermoplastic polymer may be extruded onto the surface of PPMS film to provide a heat-sealable surface, or the PPMS may be used as a clear, glossy and attractive surface coating for other films.

We claim:
1. A biaxially-oriented film consisting essentially of a layer of solid thermoplastic methyl styrene polymer, said polymer having at least 90 percent repeating units of 4-methylstyrene.

2. The film of claim 1 wherein said methylstyrene polymer has glass transition temperature exceeding 100° C.

3. The film of claim 1 characterized by optical clarity, at least 30% average linear shrinkage at 100° C., and elastic modulus of greater than $5.5 \times 10^5$.

4. The film of claim 1 wherein said methylstyrene comprises less than 5% meta isomer and less than 0.1% ortho isomer and has a glass transition temperature of about 109° C.

5. The film of claim 4 wherein the biaxial-orientation corresponds to a linear stretch ratio of about 2:1 to 8:1.

* * * * *